(12) United States Patent
Jain et al.

(10) Patent No.: US 8,515,987 B1
(45) Date of Patent: Aug. 20, 2013

(54) DATABASE INFORMATION CONSOLIDATION

(75) Inventors: Deepak Jain, Redwood City, CA (US);
Neil W. Vaz, San Francisco, CA (US);
Raymond H. Sayre, San Francisco, CA (US); Stanley G. Knutson, San Francisco, CA (US); Nathan D. T. Boyd, San Francisco, CA (US); Paul E. Friedman, Redwood City, CA (US)

(73) Assignee: Dun & Bradstreet, Inc., Short Hills, NJ (US)

( * ) Notice: Subject to any disclaimer, the term of this patent is extended or adjusted under 35 U.S.C. 154(b) by 0 days.

(21) Appl. No.: 11/014,682

(22) Filed: Dec. 15, 2004

(51) Int. Cl.
*G06F 7/00* (2006.01)

(52) U.S. Cl.
USPC .......................... 707/769; 707/808; 707/809

(58) Field of Classification Search
None
See application file for complete search history.

(56) References Cited

U.S. PATENT DOCUMENTS

| | | | |
|---|---|---|---|
| 5,511,186 A * | 4/1996 | Carhart et al. | 707/2 |
| 6,084,908 A * | 7/2000 | Chiang et al. | 375/240.03 |
| 6,609,120 B1 * | 8/2003 | Honarvar et al. | 707/3 |
| 6,985,926 B1 * | 1/2006 | Ferlauto et al. | 709/206 |
| 2002/0030703 A1 * | 3/2002 | Robertson et al. | 345/853 |
| 2003/0046280 A1 * | 3/2003 | Rotter et al. | 707/6 |
| 2003/0126156 A1 * | 7/2003 | Stoltenberg et al. | 707/104.1 |
| 2004/0044579 A1 * | 3/2004 | Leutze et al. | 705/15 |

\* cited by examiner

*Primary Examiner* — Fred I Ehichioya
*Assistant Examiner* — Hasanul Mobin
(74) *Attorney, Agent, or Firm* — Ohlandt, Greeley, Ruggiero & Perle, LLP.

(57) ABSTRACT

A method of consolidating records from databases is disclosed. The method comprises initially making a first identification of a candidate match between records using a first search technique. The method further comprises making a second identification of a candidate match between records using a second search technique, and displacing the first identification of a candidate match between records based on a probability that the second identification is correct.

39 Claims, 7 Drawing Sheets

DATABASE INFORMATION CONSOLIDATION

FIELD OF THE INVENTION

The present invention relates generally to databases. More specifically, a consolidator of database information is disclosed.

BACKGROUND OF THE INVENTION

Many organizations use database systems to organize information. It is not uncommon for an organization to use multiple database systems. For example, a large business may use one system for customer relation management, one system for billing, one system to gather information from a web portal, one system for enterprise resource planning, and one system for customer support. These and other systems are referred to generically as database systems. Because of the multiple systems, one problem that arises is that there are differences in the information in the different databases even if the information is tied to the same customer company, supplier company, person, product or material. In some cases, the information is not the same because the company has moved, changed name, merged, or been acquired. Another problem that arises is that there may be multiple records in one database or multiple databases that all refer to the same company. In some cases, the multiple records arise because a database record was input with a spelling difference in company name or the company name was entered with a different punctuation or capitalization (i.e. Company Name, Inc. or Company Name Incorporated). It would be useful if the database information could be consolidated into one list eliminating differences in or multiple copies of information.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

In the present invention, a consolidator of database information is disclosed. The consolidator takes in information from multiple databases and creates a master list. This master list can be used for management or data stewardship purposes or for report generation. In general, a database contains records with information. Information in the records has a hierarchy. For the purpose of example, in the following discussion, the top level of the hierarchy is the company, the next level down is the number of sites for the company, and the next level down is the people located at a given site. At each level, the records have associated information. For example, a company has a name, revenue, tax identification number, number of employees, etc. A site has an address, a number of employees, a functional specialty, etc. People at a given site will have a name, a social security number, a phone number, a title, etc. It is clear that the following can apply to more levels of hierarchy or database records related to other types of information.

A master list links records that likely refer to the same top level of the hierarchy—the same company—allowing intelligent reconciliation of conflicting information and consolidation of information. For example, if the same company is listed in multiple records, the master list allows the reconciliation of different addresses entries (for example by checking the most recently entered address in all the different records) and the consolidation of sales records for a company with database records under different name variations. In some embodiments, master list links can also be created for other levels in the hierarchy.

Figure 1:
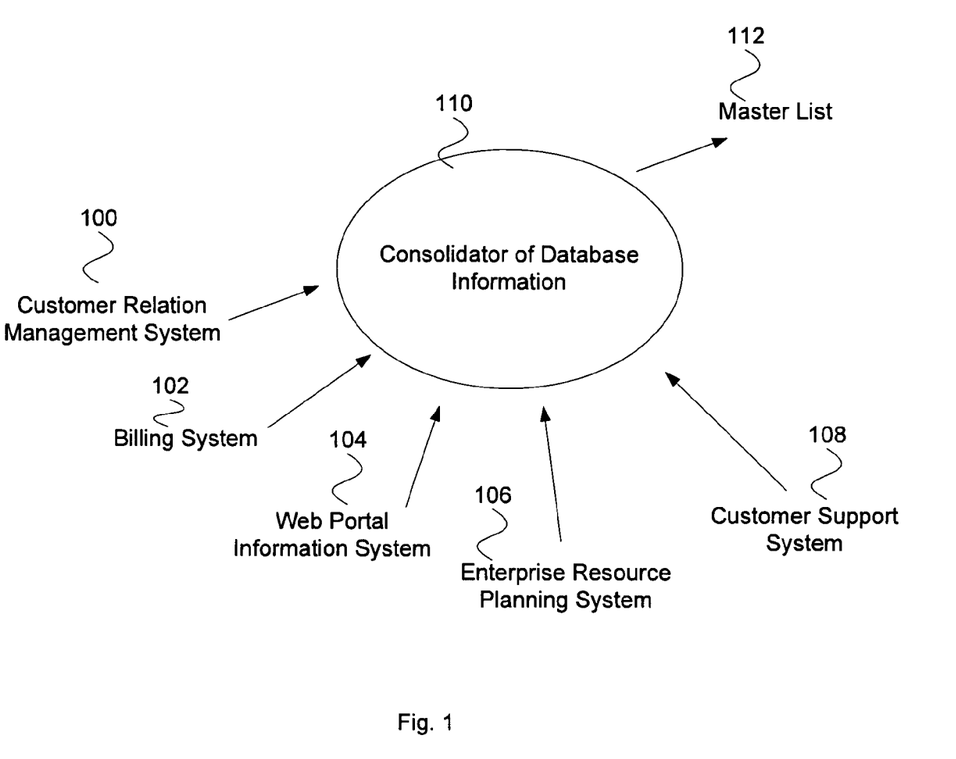
FIG. 1 illustrates a consolidator of database information.

FIG. 1 illustrates a consolidator of database information. Consolidator 110 takes as input the databases of a number of systems. The input systems include: customer relation management database 100, billing system 102, web portal information system 104, enterprise resource planning system 106, and customer support system 108. Consolidator 110 has as output a master list 112. The master list 112 is a linked list of database records.

Figure 2:
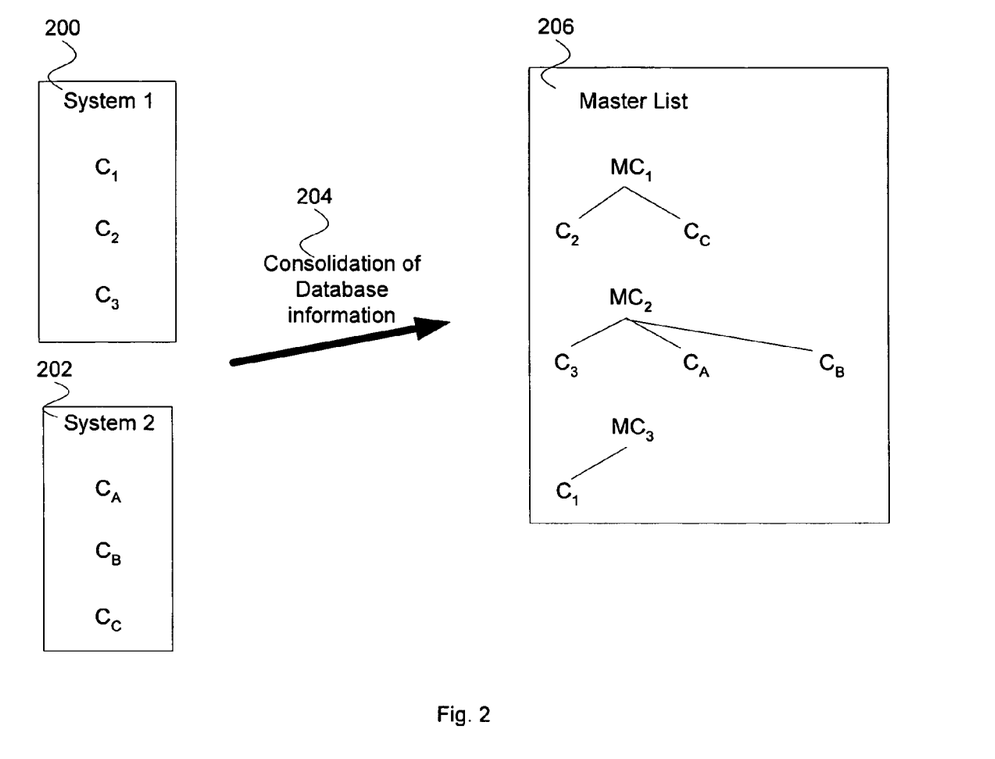
FIG. 2 illustrates a consolidation of database information.

FIG. 2 illustrates consolidation of database information. System 1 200 is a database system with records $C_1$, $C_2$, and $C_3$. System 2 202 is a database system with records $C_A$, $C_B$, and $C_C$. In some embodiments, the database records are company records or people records. In some embodiments, the database records are customer records or supplier records. In some embodiments, the system 1 database records are called primary records. The database records are processed by the consolidator of database information 204 to create a master list 206. Master list 206 indicates a list of master records $MC_1$, $MC_2$, and $MC_3$ that are linked to records from system 1 200 and system 2 202. Master record $MC_1$ is linked to $C_2$ and $C_C$. Master record $MC_2$ is linked to $C_3$, $C_A$ and $C_B$. Master record $MC_3$ is linked to $C_1$. The links have accompanying information. Accompanying information includes the matching process used to establish the link as well as the probability of or confidence in the link. In some embodiments, the consolidator consolidates information within a given system.

Figure 3:
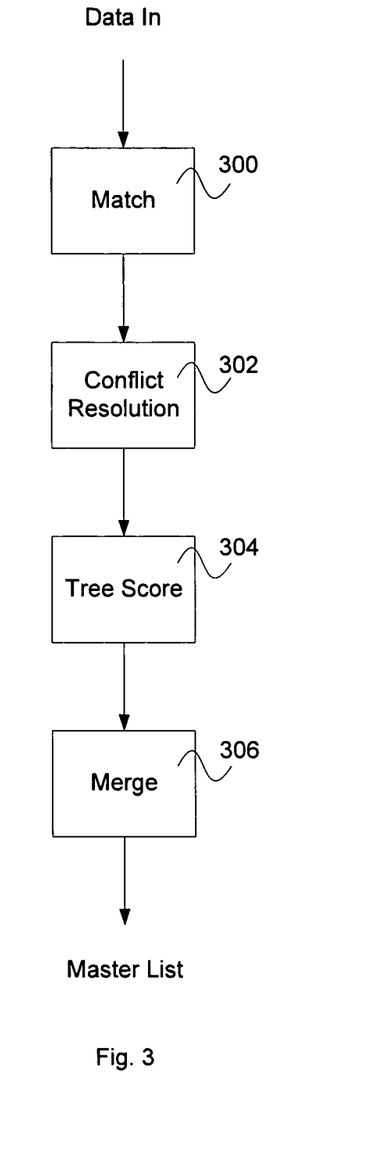
FIG. 3 illustrates a process for consolidation of database information.

FIG. 3 illustrates a process for consolidation of database information. Database information is input into match 300.

Match 300 creates candidate matches between the input database information records and assigns a probability score to the match. These candidate matches are put into groups. Probability scores assigned to the matches are influenced by factors such as the source database for a given piece of information and the date of the information. For example in some embodiments, the customer service database might have more reliable phone contact information than the web portal information database, and thus if two records are linked because of this information, a higher probability is assigned to the link. Another example is if information used to link two records originates from a database that is professionally maintained (Dun and Bradstreet database or credit rating database), then in some embodiments a higher probability is assigned to the link.

Match 300 uses a number of techniques to match input database information records. Records are first reduced to an essential set before comparing. For example, a site record would be compressed to remove strings like "street" and "avenue". In some embodiments, the compression also involves a hash function so that the compressed record can be easily compared. A brute force matching technique that compares all records to all records could be used, but this requires substantial computational resources. Other techniques that limit the search space can be used to make the searching more efficient. These efficient techniques for matching include top-down searching, bottom-up searching, and transactional searching. Top-down searching limits searches to connections found in the hierarchy and propagates the search from the top of the hierarchy of a database's information downward. Bottom-up searching limits searches to connections found in the hierarchy and propagates the search from the bottom of the hierarchy of a database's information upward. Transactional searching limits searches to records that are linked between database systems.

The candidate match groups, which are a group of records that match each other, are then processed by conflict resolution 302. Conflict resolution 302 reduces the candidate match links, which are the links between these matched records with the associated probability that the records match, for each company so that a given company only appears in one match group (i.e. one set of linked matches). Conflict resolution 302 uses factors such as the source database type, the record information type that created the link, the searching technique, and weighting to reduce the number of sets that a given company is associated with. For example, when resolving conflicts, there are biases built in to remove duplicates that have lower probabilities assigned to the link as well as biases toward larger match groups.

The match groups are then processed by tree score 304. Tree score 304 calculates a combined score for each company in match group. In some embodiments, the score is the total of a first weight times the company score plus a second weight times the common site score plus a third weight times the people score. The common site score is the total of adding the probabilities for all the sites that are common between the matched companies. The common people score is the total of adding the probabilities for all the people that are common between the matched companies.

The match groups are then processed by merge 306. Merge 306 uses the tree score to determine whether the information within the merge group should be merged. If the tree score is above the hard match cut-off, which is a user defined threshold over which two records are deemed to be an exact match, then the information records are merged. If the tree score is between the soft match cut-off, which is a second user defined threshold over which two records are deemed to be a soft match, and the hard match cut-off, then the information records are not merged but a link is indicated between the records. If the tree score is blow the soft match cut-off, then the records are left as separate. The merged groups are then output and sent on for data stewardship/management or for report making.

Figure 4:
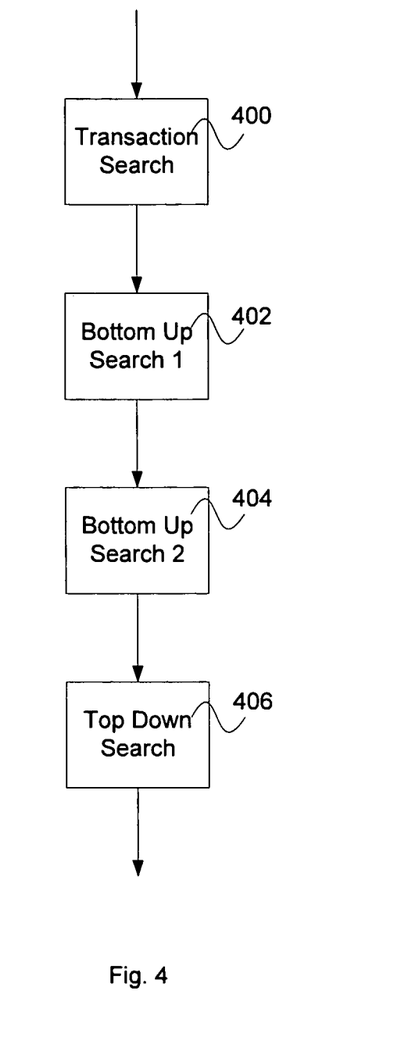
FIG. 4 illustrates a process for match searching.

FIG. 4 illustrates a process for match searching. When a primary database record is identified to match a record with a certain probability, the primary record, the record, and the probability are considered a candidate match. The primary database record and the record both include subrecords. The Database record candidate matches are identified using transaction search 400. Then, database record candidate matches are identified by searching from sites to company in bottom-up match 1 402 and by searching from people to company in bottom-up match 2 404. Next, database record candidate matches are identified by searching from company to sites to people in top-down match 406.

Figure 5:
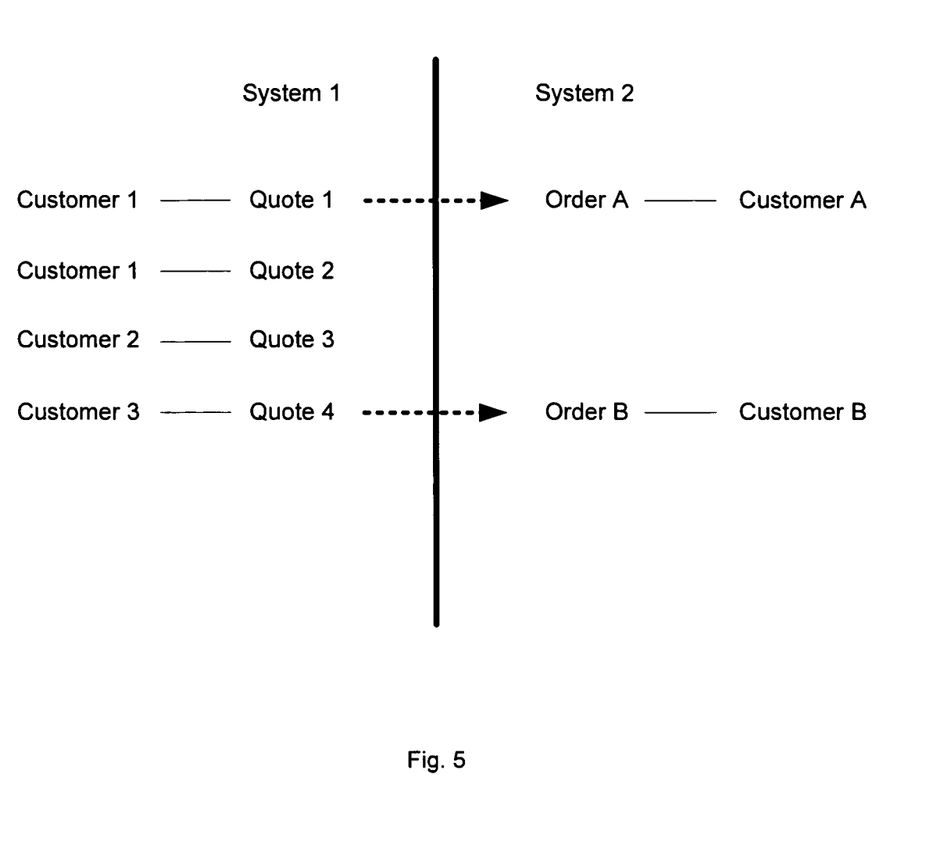
FIG. 5 illustrates transaction searching for matching.

FIG. 5 illustrates transaction searching for matching. System 1 represents a system involved with customer relation management. In this system, customers are contacted often, and many quotes are generated. Some of these quotes will lead to orders. The order will be entered into another system, like an enterprise resource planning system, where the order will be manually linked to the quote. In this example, customer 1 in system 1 can be linked with customer A in system 2. Similarly, customer 3 can be linked with customer B in system 2. In addition, a probability will be assigned to this link. In some embodiments, the probability will be a function of the time since the date of the order. The function is a decay function of 0.5% to 1% per month indicating that the information will go "stale" at certain pace each month. In these cases, candidate matches are identified. These candidate matches are in addition to other searching technique candidates. After all the matches are resolved for conflicts, tree scored, and merged, a transaction generated candidate match could survive based on the candidate match's probability based score, and the transaction candidate match could displace matches produced by other search techniques.

Figure 6:
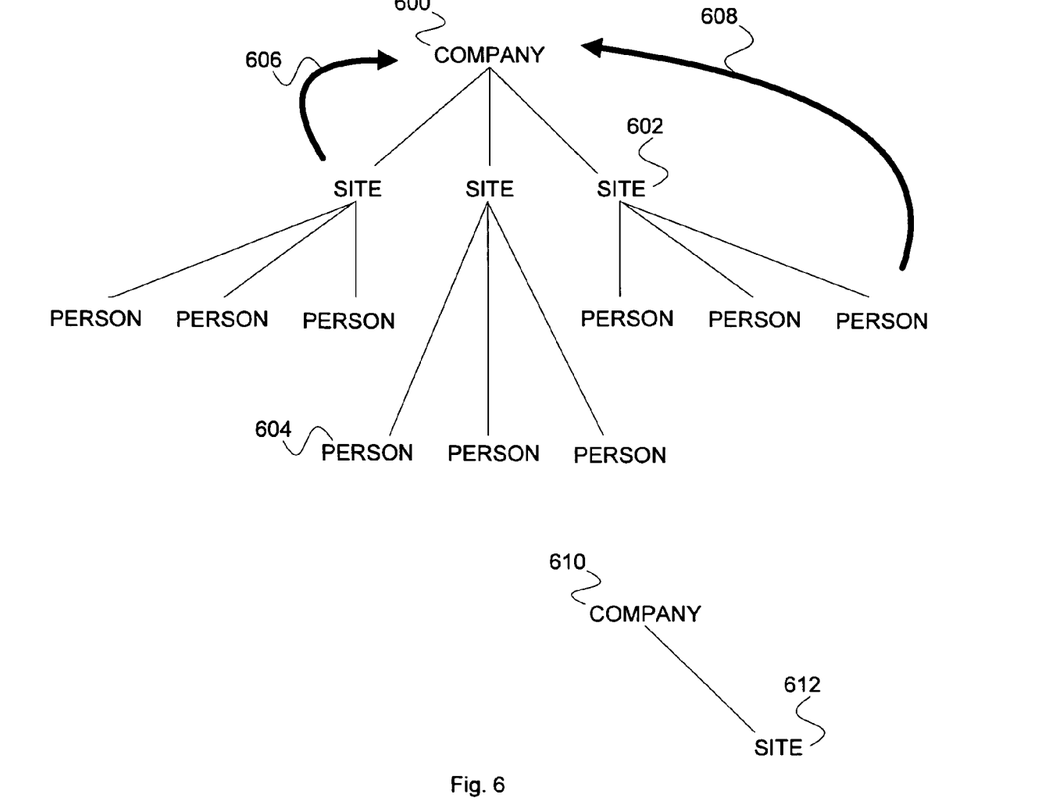
FIG. 6 illustrates bottom-up searching for matching.

FIG. 6 illustrates bottom-up searching for matching. Three levels of a hierarchy are shown. Company 600 is at the top level of the hierarchy. Site 602 is at the next level down in the hierarchy. Person 604 is at the bottom level of the hierarchy. Bottom-up searching for matching can start at the site level and move to the company level as indicated by arrow 606. Bottom-up searching for matching can start at the person level and move up to the site level and then to the company level as indicated by arrow 608. Both types of bottom up searching can be used to identify candidate matches for companies. For example, if site 602 matches very closely to site 612 associated with company 610, this would create a candidate match between company 600 and company 610. In addition, a probability will be assigned to this match. In some embodiments, the probability assigned is based on the number of close matches between the database records and/or subrecords and the degree of similarity between the matches. This type of matching can identify a smaller merged or acquired company inside a larger company. Similar bottom-up created candidate matches are in addition to other searching technique candidates. After all the matches are resolved for conflicts, tree scored, and merged, a bottom-up generated candidate match could survive based on the candidate match's probability based score, and the bottom-up candidate match could displace matches produced by other search techniques.

Figure 7:
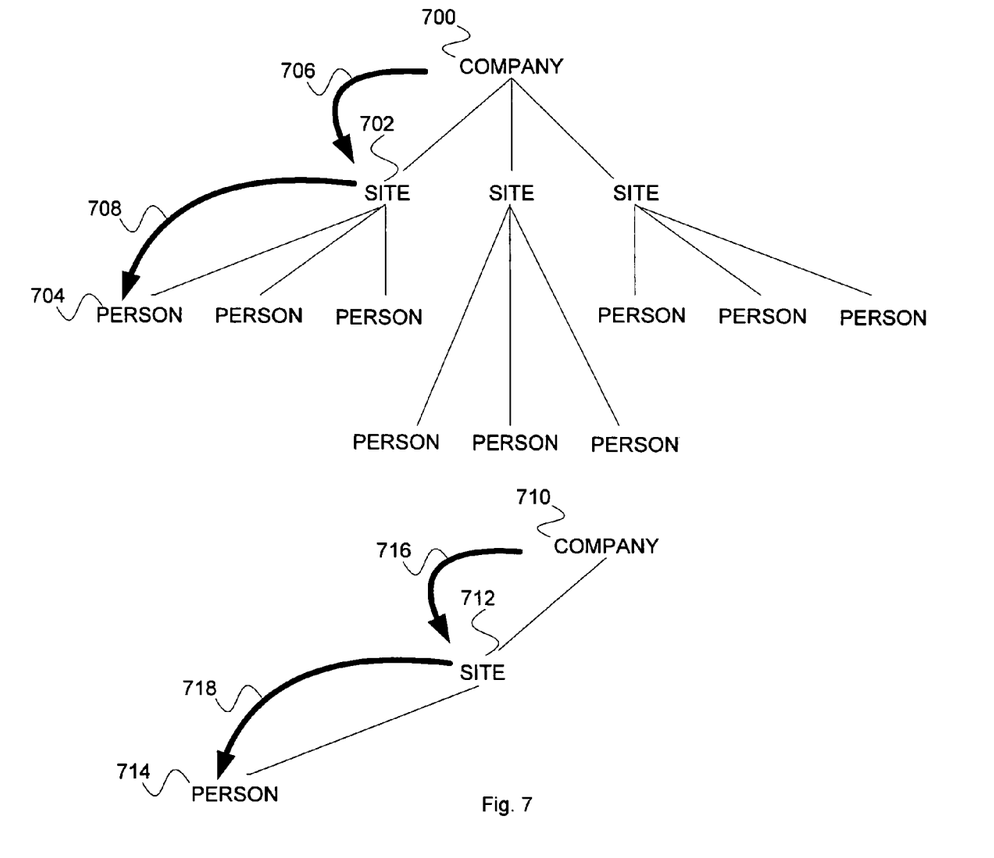
FIG. 7 illustrates top-down searching for matching.

FIG. 7 illustrates top-down searching for matching. Three levels of a hierarchy are shown. Company 700 is at the top level of the hierarchy. Site 702 is at the next level down in the hierarchy. Person 704 is at the bottom level of the hierarchy. Top-down searching for matching starts at the company level and moves to the site level as indicated by arrow 706 and then to the person level from the site level as indicated by arrow 708. Top-down searching for matching can be used to identify candidate matches for companies. For example, if company 700 matches very closely to company 710 and site 702 matches closely with site 712 and person 704 matches closely with person 714, this would create a candidate match between company 700 and company 710. In addition, a probability will be assigned to this match. In some embodiments, the probability assigned is based on the number of close matches between the database records and/or subrecords and the degree of similarity between the matches. Similar top-down identified candidate matches are in addition to other searching technique candidates. After all the matches are resolved for conflicts, tree scored, and merged, a top-down generated candidate match could survive based on the candidate match's probability based score, and the top-down candidate match could displace matches produced by other search techniques.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of consolidating a plurality of records from a plurality of databases comprising:
   receiving the plurality of records from the plurality of databases, wherein a record of the plurality of records has associated information that has a hierarchy;
   identifying a first candidate match record associated with a first item of information in a first information hierarchy;
   identifying a second candidate match record associated with a second item of information in a second information hierarchy that matches the first candidate match record using a search technique, wherein the search technique searches over a set of records that is smaller than the plurality of records, wherein the set of records that is smaller than the plurality of records is identified based at least in part on:
      a first position of the first item of information in the first information hierarchy associated with the first candidate match record and
      a second position of the second item of information in the second information hierarchy associated with the second candidate match record, and wherein the second candidate match record is identified based at least in part on:
      the first position of the first item of information in the first information hierarchy matching the second position of the second item of information in the second information hierarchy and a third position of a third item of information in the first information hierarchy having been previously matched to a fourth position of a fourth item of information in the second information hierarchy;
   in the event that a first probability indicates that the first candidate match record is correct, displacing the second candidate match record and outputting the first candidate match record as a matched record;
   in the event that a second probability indicates that the second candidate match record is correct, displacing the first candidate match record and outputting the second candidate match record as the matched record;
   grouping the matched record with other records that match the matched record, thus yielding a match group;
   scoring the match group based on probabilities that records in the match group are correctly matched, thus yielding a score; and
   merging records in the match group into a consolidated records list, if the score is greater than a predefined threshold.

2. The method as recited in claim 1 wherein the search technique comprises transaction searching.

3. The method as recited in claim 1 wherein the search technique comprises bottom-up searching.

4. The method as recited in claim 1 wherein the search technique comprises top-down searching.

5. The method as recited in claim 1 wherein the plurality of records comprise company records.

6. The method as recited in claim 1 wherein the plurality of records comprise site records.

7. The method as recited in claim 1 wherein the plurality of records comprise people records.

8. The method as recited in claim 1 wherein the plurality of records comprise customer records.

9. The method as recited in claim 1 wherein the plurality of records comprise supplier records.

10. The method as recited in claim 1 wherein the plurality of records comprise product records.

11. The method as recited in claim 1 wherein the plurality of records comprise material records.

12. The method as recited in claim 1 wherein the probability is based on close matches between records.

13. The method as recited in claim 1 wherein the probability is based on date of an information entry.

14. A system of consolidating a plurality of records from a plurality of databases comprising:
   a processor; and
   a memory coupled with the processor, wherein the memory is configured to provide the processor with instructions which when executed cause the processor to:
   receive the plurality of records from the plurality of databases, wherein a record of the plurality of records has associated information that has a hierarchy;
   identify a first candidate match record associated with a first item of information in a first information hierarchy;
   identify a second candidate match record associated with a second item of information in a second information hierarchy that matches the first candidate match record using a search technique, wherein the search technique searches over a set of records that is smaller than the plurality of records, wherein the set of records that is smaller than the plurality of records is identified based at least in part on:
      a first position of the first item of information in the first information hierarchy associated with the first candidate match record and
      a second position of the second item of information in the second information hierarchy associated with the second candidate match record, and wherein the second candidate match record is identified based at least in part on:
      the first position of the first item of information in the first information hierarchy matching the second position of the second item of information in the second information hierarchy and a third position of a third item of information in the first information hierarchy having been previously matched to a fourth position of a fourth item of information in the second information hierarchy;

in the event that a first probability indicates that the first candidate match record is correct, displace the second candidate match record and output the first candidate match record as a matched record;

in the event that a second probability indicates that the second candidate match record is correct, displace the first candidate match record and output the second candidate match record as the matched record;

grouping the matched record with other records that match the matched record, thus yielding a match group;

scoring the match group based on probabilities that records in the match group are correctly matched, thus yielding a score; and merging records in the match group into a consolidated records list, if the score is greater than a predefined threshold.

15. The system as recited in claim 14 wherein the search technique comprises transaction searching.

16. The system as recited in claim 14 wherein the search technique comprises bottom-up searching.

17. The system as recited in claim 14 wherein the search technique comprises top-down searching.

18. The system as recited in claim 14 wherein the plurality of records comprise company records.

19. The system as recited in claim 14 wherein the plurality of records comprise site records.

20. The system as recited in claim 14 wherein the plurality of records comprise people records.

21. The system as recited in claim 14 wherein the plurality of records comprise customer records.

22. The system as recited in claim 14 wherein the plurality of records comprise supplier records.

23. The system as recited in claim 14 wherein the plurality of records comprise product records.

24. The system as recited in claim 14 wherein the plurality of records comprise material records.

25. The system as recited in claim 14 wherein the probability is based on close matches between records.

26. The system as recited in claim 14 wherein the probability is based on date of an information entry.

27. A computer program product for consolidating a plurality of records from a plurality of databases, the computer program product being embodied in a non-transitory computer readable medium and comprising computer instructions for:

receiving the plurality of records from the plurality of databases, wherein a record of the plurality of records has associated information that has a hierarchy;

identifying a first candidate match record associated with a first item of information in a first information hierarchy;

identifying a second candidate match record associated with a second item of information in a second information hierarchy that matches the first candidate match record using a search technique, wherein the search technique searches over a set of records that is smaller than the plurality of records, wherein the set of records that is smaller than the plurality of records is identified based at least in part on:

a first position of the first item of information in the first information hierarchy associated with the first candidate match record and a second position of the second item of information in the second information hierarchy associated with the second candidate match record, and wherein the second candidate match record is identified based at least in part on:

the first position of the first item of information in the first information hierarchy matching the second position of the second item of information in the second information hierarchy and a third position of a third item of information in the first information hierarchy having been previously matched to a fourth position of a fourth item of information in the second information hierarchy;

in the event that a first probability indicates that the first candidate match record is correct, displacing the second candidate match record and output the first candidate match record as a matched record;

in the event that a second probability indicates that the second candidate match record is correct, displacing the first candidate match record and output the second candidate match record as a matched record;

grouping the matched record with other records that match the matched record, thus yielding a match group;

scoring the match group based on probabilities that records in the match group are correctly matched, thus yielding a score; and merging records in the match group into a consolidated records list, if the score is greater than a predefined threshold.

28. The computer program product as recited in claim 27 wherein the search technique comprises transaction searching.

29. The computer program product as recited in claim 27 wherein the search technique comprises bottom-up searching.

30. The computer program product as recited in claim 27 wherein the search technique comprises top-down searching.

31. The computer program product as recited in claim 27 wherein the plurality of records comprise company records.

32. The computer program product as recited in claim 27 wherein the plurality of records comprise site records.

33. The computer program product as recited in claim 27 wherein the plurality of records comprise people records.

34. The computer program product as recited in claim 27 wherein the plurality of records comprise customer records.

35. The computer program product as recited in claim 27 wherein the plurality of records comprise supplier records.

36. The computer program product as recited in claim 27 wherein the plurality of records comprise product records.

37. The computer program product as recited in claim 27 wherein the plurality of records comprise material records.

38. The computer program product as recited in claim 27 wherein the probability is based on close matches between records.

39. The computer program product as recited in claim 27 wherein the probability is based on date of an information entry.

* * * * *